United States Patent
Colson et al.

(10) Patent No.: US 11,320,206 B2
(45) Date of Patent: May 3, 2022

(54) PRESSURE VESSEL WITH BARRIER LAYER

(71) Applicant: Hamilton Sundstrand Corporation, Charlotte, NC (US)

(72) Inventors: Paul M. Colson, Westfield, MA (US); Thomas James Killen, West Hartford, CT (US); Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 27 days.

(21) Appl. No.: 16/593,660

(22) Filed: Oct. 4, 2019

(65) Prior Publication Data

US 2021/0102757 A1 Apr. 8, 2021

(51) Int. Cl.
*F28D 7/10* (2006.01)
*F28F 1/00* (2006.01)

(52) U.S. Cl.
CPC .............. *F28D 7/106* (2013.01); *F28F 1/003* (2013.01)

(58) Field of Classification Search
CPC ................................ F28D 7/106; F28F 1/003
USPC ........................................................ 165/154
See application file for complete search history.

(56) References Cited

U.S. PATENT DOCUMENTS

| | | | |
|---|---|---|---|
| 4,237,968 A | 12/1980 | Duke | |
| 4,249,593 A | 2/1981 | Bieberbach et al. | |
| 4,410,109 A * | 10/1983 | Murrell, Jr. | ........... F16K 31/365 137/469 |
| 4,767,593 A | 8/1988 | Wedellsborg | |
| 5,048,597 A | 9/1991 | Bond | |
| 5,527,507 A * | 6/1996 | Childers | ................... A61L 2/24 422/28 |
| 5,668,534 A | 9/1997 | Haboian et al. | |
| 5,702,026 A * | 12/1997 | Lindquist | ............... B65D 90/36 220/565 |
| 7,063,133 B2 | 6/2006 | Gordon et al. | |
| 7,938,171 B2 | 5/2011 | Norris et al. | |
| 10,748,783 B2 * | 8/2020 | Khan | ................ H01L 21/67017 |
| 2009/0113995 A1 | 5/2009 | Golding et al. | |
| 2010/0314081 A1* | 12/2010 | Reis | ........................ F28D 1/047 165/134.1 |
| 2014/0345836 A1* | 11/2014 | Stovring | ................. F28D 7/024 165/163 |
| 2017/0059444 A1* | 3/2017 | Sagi | ........................ G01M 3/26 |

FOREIGN PATENT DOCUMENTS

| | | |
|---|---|---|
| AU | 693725 | 7/1998 |
| AU | 2001252175 B2 | 8/2004 |
| AU | 2004229151 A1 | 10/2004 |

(Continued)

OTHER PUBLICATIONS

Extended European Search Report for European Patent Application No. 19213575.4, dated Jul. 3, 2020, 9 pages.

*Primary Examiner* — Davis D Hwu

(74) *Attorney, Agent, or Firm* — Kinney & Lange, P.A.

(57) ABSTRACT

A pressure vessel includes a first container and a second container surrounding the first container and including a fluid port. The pressure vessel further includes a barrier space extending between the first container and the second container and a leak detection mechanism connected to the fluid port on the second container that is configured to detect a leak in the pressure vessel.

20 Claims, 6 Drawing Sheets

(56) References Cited

FOREIGN PATENT DOCUMENTS

| | | |
|---|---|---|
| AU | 2010202304 B2 | 6/2010 |
| AU | 2011276394 B2 | 11/2016 |
| CA | 2218042 A1 | 10/1996 |
| CA | 2212244 C | 5/2007 |
| CA | 2721747 C | 1/2016 |
| CA | 2955613 A1 | 7/2017 |
| DE | 10062089 C1 | 12/2001 |
| GB | 1130830 | 10/1968 |
| JP | 2014010085 A | 1/2014 |
| KR | 20040011763 A | 2/2004 |
| KR | 20160091933 A | 8/2016 |
| MX | 2012012293 A | 3/2013 |
| WO | WO2004091773 A1 | 10/2004 |

\* cited by examiner

PRESSURE VESSEL WITH BARRIER LAYER

BACKGROUND

The present disclosure relates to double-walled pressure vessels, and in particular, to double-walled pressure vessels with heat exchange capabilities.

Pressure vessels often hold hazardous fluids which could contaminate external environments or adjacent circuits if the fluids were to leak. Pressure vessels can be damaged over time by steady and cyclic loads due to temperature changes, vibration, pressure, and acceleration. Manufacturing or material defects, corrosion, and wear from fluid abrasion in high stress areas may also cause leaks to develop over time. A double-walled design is used to isolate leaks. A double-walled pressure vessel is created by placing a primary pressure vessel inside of a secondary pressure vessel with a barrier layer in-between. The barrier layer is an empty volume at the pressure of the exterior environment. The barrier layer isolates the leak so it can be safely drained and damage can be identified prior to any leak into an external environment or adjacent fluid circuit.

Current double-walled pressure vessels are not ideal for applications that require maximum heat transfer between the interior and the exterior of the pressure vessel. The empty volume in the barrier layer acts as a thermal insulator.

SUMMARY

A pressure vessel includes a first container and a second container surrounding the first container and including a fluid port. The pressure vessel further includes a barrier space extending between the first container and the second container and a leak detection mechanism connected to the fluid port on the second container that is configured to detect a leak in the pressure vessel.

A pressure vessel system includes a first pressure vessel and a second pressure vessel. The first pressure vessel includes a first container, a second container surrounding the first container and including a fluid port, and a barrier space extending between the first container and the second container. The second pressure vessel includes a first container, a second container surrounding the first container and including a fluid port, and a barrier space extending between the first container and the second container. The pressure vessel system further includes a central drain port fluidly coupled to the fluid port of the first pressure vessel and the fluid port of the second pressure vessel.

DETAILED DESCRIPTION

Figure 1A:
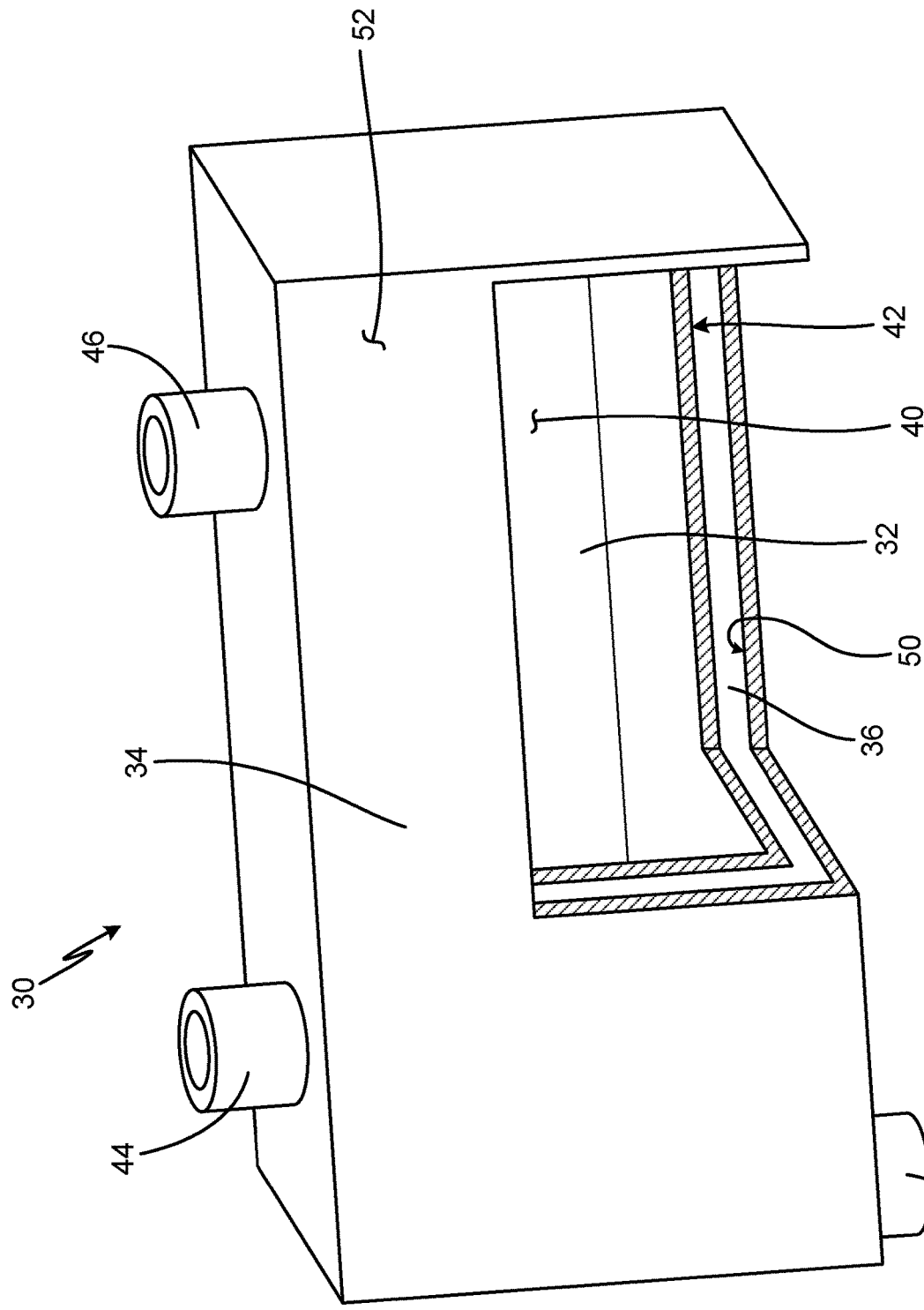
FIG. 1A is a perspective view of a pressure vessel with a barrier space and a fluid port.
Figure 1B:
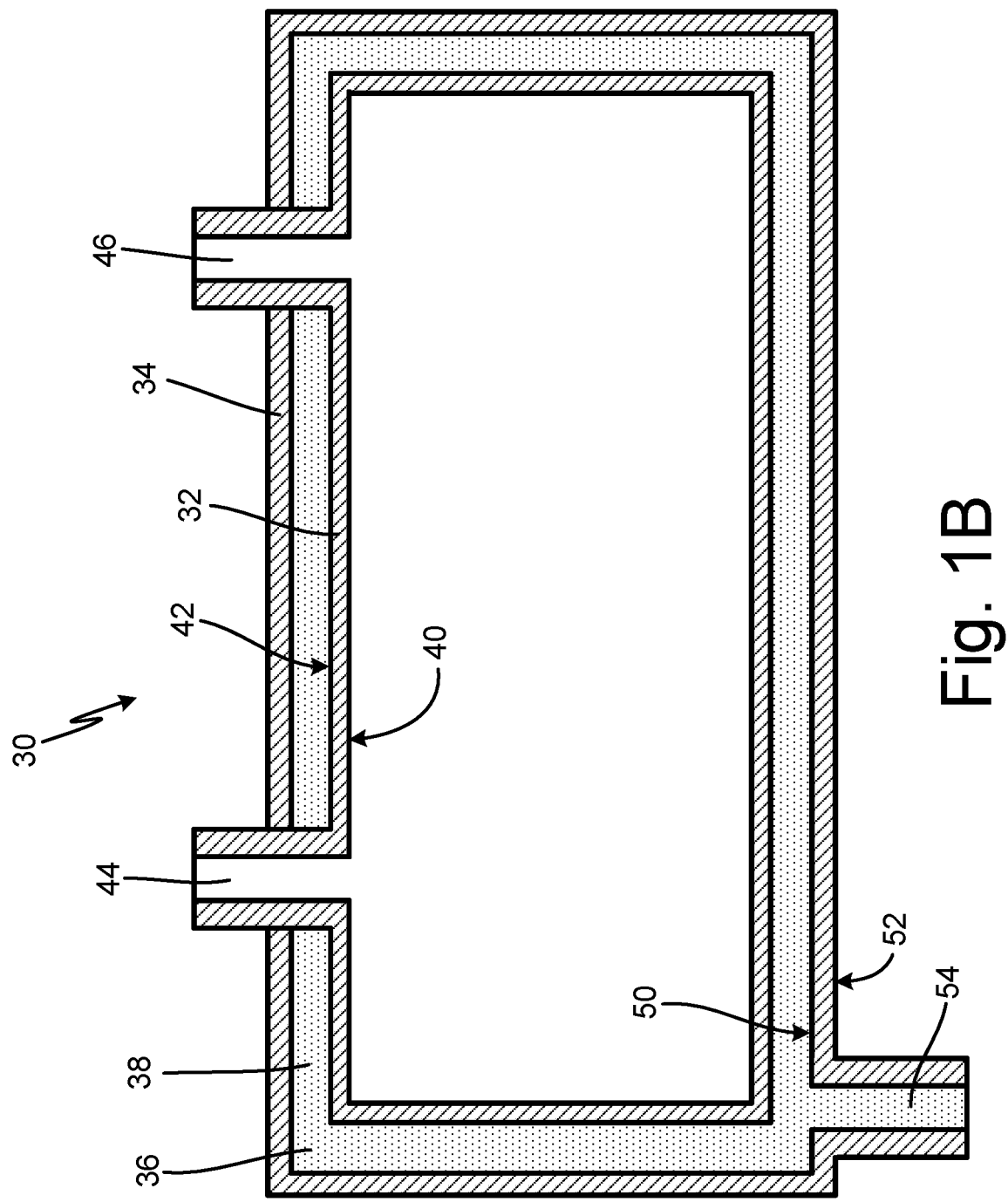
FIG. 1B is a cross-sectional view of the pressure vessel of FIG. 1A.

FIG. 1A is a perspective view of pressure vessel 30 with barrier space 36 and fluid port 54. FIG. 1B is a cross-sectional view of pressure vessel 30. Pressure vessel 30 includes inner container 32, outer container 34, barrier space 36, and captive fluid 38 (shown in FIG. 1B). Inner container 32 includes inner surface 40, outer surface 42, inlet 44, and outlet 46. Outer container 34 includes inner surface 50, outer surface 52, and fluid port 54.

Pressure vessel 30 is a double-walled pressure vessel that has inner container 32 positioned within outer container 34. Inner container 32 is a first container and outer container 34 is a second container. Barrier space 36 is formed between inner container 32 and outer container 34. Barrier space 36 contains captive fluid 38 between inner container 32 and outer container 34.

Inner container 32 includes inner surface 40 and outer surface 42. Inner surface 40 forms an interior of inner container 32 and will come into contact with fluids in inner container 32. Outer surface 42 forms an exterior of inner container 32 and will come into contact with captive fluid 38 in barrier space 36. Outer surface 42 defines an interior boundary of barrier space 36. Inner container 32 further includes inlet 44 and outlet 46 that form fluid openings for accessing an interior of inner container 32. A fluid can be delivered to inner container 32 through inlet 44 and can be expelled from inner container 32 through outlet 46. Inlet 44 and outlet 46 are shown as being on one side of inner container 32 in the embodiment shown in FIGS. 1A-1B, but can each be positioned on any side of inner container 32 in alternate embodiments.

Outer container 34 includes inner surface 50 and outer surface 52. Inner surface 50 forms an interior of outer container 34 and will come into contact with captive fluid 38 in barrier space 36. Inner surface 50 defines an exterior boundary of barrier space 36. Outer surface 52 forms an exterior of outer container 34 and will come into contact with an exterior environment surrounding pressure vessel 30. Outer container 34 further includes fluid port 54 that forms a point for accessing barrier space 36. Captive fluid 38 can be delivered to and evacuated from barrier space 36 through fluid port 54. Fluid port 54 is shown as being on a bottom side of outer container 34 in the embodiment shown in FIGS. 1A-1B, but can be positioned on any side of outer container 34 in alternate embodiments.

Outer container 34 attaches to inner container 32 at inlet 44 and outlet 46. Inner container 32 and outer container 34 are integrally formed to create pressure vessel 30. Pressure vessel 30 can be made out of nickel alloys, ceramics, carbon alloys, or any other suitable material. Integrally manufacturing pressure vessel 30 reduces manufacturing time and creates fewer possible leak paths in finished pressure vessel 30 by minimizing welding, brazing, or other joining methods. Integral manufacturing also reduces the weight of pressure vessel 30. Integrally manufacturing pressure vessel 30 allows for many possible finished geometries of pressure vessel 30, for example tanks, pipes, and conformal shapes. Utilizing nickel alloys, ceramics, or carbon alloys also helps minimize the weight of pressure vessel 30. Nickel alloys, ceramics, or carbon alloys can also be chosen as proper materials for pressure vessel 30 depending on what pressure vessel 30 is being used for, what fluid is being stored in pressure vessel 30, and the space pressure vessel 30 needs for its finished volume.

Inner container 32 and outer container 34 are integrally formed. Integrally forming pressure vessel 30 decreases manufacturing time and lowers possible leak paths through joints because there are fewer joining methods necessary for manufacturing. Integral formation also lowers the weight and size of vessel 30.

Pressure vessel 30 has a double-walled construction and is designed to hold a fluid within inner container 32. Outer container 34 creates a second barrier between inner container 32 and an exterior environment. The fluid enters inner container 32 through inlet 44 and exits inner container 32 through outlet 46. If the fluid in inner container 32 leaks through inner container 32, it will be caught in barrier space 36 instead of leaking into the exterior environment surrounding pressure vessel 30.

Captive fluid 38 can be a fluid with a high heat transfer coefficient, such as a pressurized inert gas (for example pressurized nitrogen or pressurized helium), a thermal oil, a liquid metal (for example liquid sodium, liquid sodium-potassium, liquid lead-bismuth, or liquid nickel), a molten salt (for example molten sodium-potassium carbonates or molten sodium-potassium fluorides), or combinations thereof. Captive fluid 38 improves the heat transfer capabilities of pressure vessel 30. In a first example, heat from the fluid in inner container 32 can be transferred through inner container 32, captive fluid 38, outer container 34, and into an exterior environment surrounding pressure vessel 30 to cool the fluid in pressure vessel 30. In a second example, heat from an exterior environment surrounding pressure vessel 30 can be transferred through outer container 34, captive fluid 38, inner container 32, and into the fluid in inner container 32 to warm the fluid in pressure vessel 30. In a third example, pressure vessel 30 can include multiple inner containers 32 and outer containers 34 that can be positioned next to one another and heat from a fluid in a first pressure vessel can be transferred to fluid in a second pressure vessel.

Captive fluid 38 can be delivered to and removed from barrier space 36 through fluid port 54. Fluid port 54 can be an opening, a duct, a pipe, or any other suitable port in outer container 34. If fluid from inner container 32 leaks into barrier space 36, the leaked fluid and captive fluid 38 can be removed from barrier space 36 through fluid port 54.

Double-walled pressure vessel 30 is designed to hold a fluid within inner container 32 and efficiently exchange heat with an exterior environment. Outer container 34 acts as breach protection to keep leaked fluid within pressure vessel 30. The fluid enters pressure vessel 30 through inlet 44 and exits pressure vessel 30 through outlet 46. Fluid port 54 allows for easy removal of the leaked storage fluid from vessel 30. Should inner container 32 break, the fluid will be trapped within barrier space 36 until its removal through fluid port 54. Fluid port 54 also acts as an inlet and an outlet to charge and discharge captive fluid 38 into barrier space 36. Captive fluid 38 acts as a conductor to improve heat transfer between outer container 34 and inner container 32.

Figure 2:
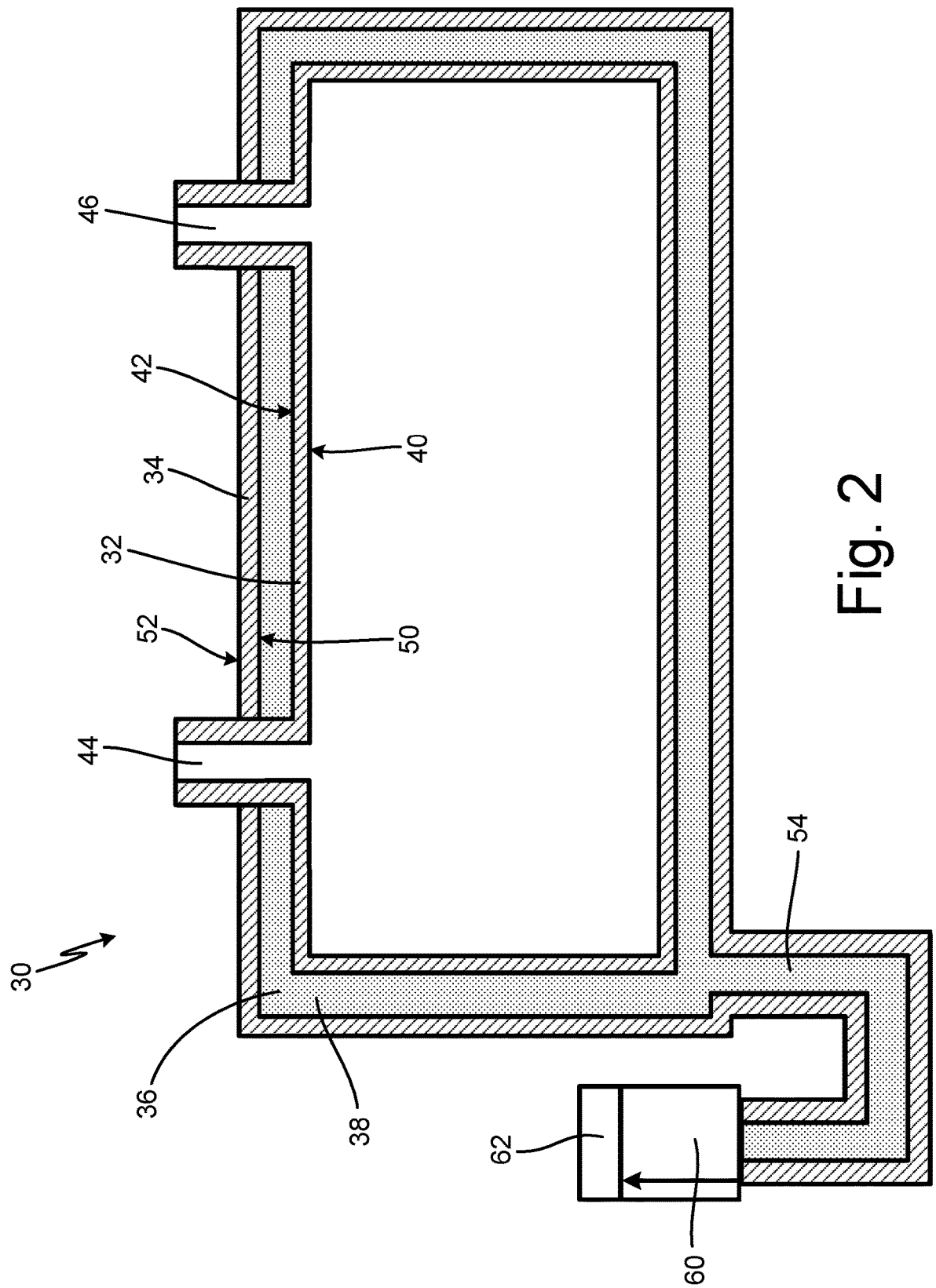
FIG. 2 is a cross-sectional view of the pressure vessel with a relief valve and a pressure sensor attached to the fluid port.

FIG. 2 is a cross-sectional view of pressure vessel 30 with relief valve 60 and pressure sensor 62 attached to fluid port 54. Pressure vessel 30 includes inner container 32, outer container 34, barrier space 36, and captive fluid 38. Inner container 32 includes inner surface 40, outer surface 42, inlet 44, and outlet 46. Outer container 34 includes inner surface 50, outer surface 52, and fluid port 54. Pressure vessel 30 also includes relief valve 60 and pressure sensor 62.

Pressure vessel 30 is a double-walled pressure vessel that has inner container 32 positioned within outer container 34. Barrier space 36 is formed between inner container 32 and outer container 34. Barrier space 36 contains captive fluid 38 between inner container 32 and outer container 34. Inner container 32 includes inner surface 40 that defines an interior of inner container 32 and outer surface 42 that defines an exterior of inner container 32. Inner container 32 further includes inlet 44 and outlet 46 that form fluid ports for accessing the interior of inner container 32. Outer container 34 includes inner surface 50 that defines an interior of outer container 34 and outer surface 52 that defines an exterior of outer container 34. Outer container 34 further includes fluid port 54 that forms a point for accessing barrier space 36. Captive fluid 38 can be delivered to and evacuated from barrier space 36 through fluid port 54.

Captive fluid 38 can be a fluid with a high heat transfer coefficient, such as a pressurized inert gas (for example pressurized nitrogen or pressurized helium), a thermal oil, a liquid metal (for example liquid sodium, liquid sodium-potassium, liquid lead-bismuth, or liquid nickel), a molten salt (for example molten sodium-potassium carbonates or molten sodium-potassium fluorides), or combinations thereof. Fluid port 54 is in fluid connection with relief valve 60, as shown in FIG. 2. Captive fluid 38 can flow through fluid port 54 to relief valve 60. If the pressure of captive fluid 38 exceeds a set threshold value, relief valve 60 can be opened to allow captive fluid 38 to flow out of barrier space 36. Captive fluid 38 can increase in pressure when the fluid in inner container 32 leaks through inner container 32 into barrier space 36. The increased pressure of captive fluid 38 with the leaked fluid will cause relief valve 60 to open to allow captive fluid 38 and the leaked fluid to be diverted through relief valve 60 to a suitable collection system. This prevents captive fluid 38 and the leaked fluid from leaking out of outer container 34 into an exterior environment.

Relief valve 60 can include pressure sensor 62. Pressure sensor 62 can sense the pressure of captive fluid 38 at relief valve 60. Captive fluid 38 is charged into barrier space 36, fluid port 54, and relief valve 60 at a known pressure. Pressure sensor 62 is then set to a range surrounding the known charge pressure depending on the thermal expansion coefficients of captive fluid 38 and the material that pressure vessel 30 is made out of. Pressure sensor 62 continuously monitors the pressure of captive fluid 38. If inner container 32 breaches and captive fluid 38 moves into inner container 32 because inner container 32 is at a lower pressure than barrier space 36, then pressure sensor 62 will detect the pressure deviation from the expected value. Similarly, if inner container 32 breaches and the stored fluid moves into barrier space 36, then pressure sensor 62 will sense the change in pressure compared to the known charge value. If outer container 34 were to breach, then pressure sensor 62 would detect the change in pressure from the known charge value. When pressure sensor 62 senses a change in pressure from the known charge value, relief valve 60 can be opened to remove captive fluid 38 and the leaked fluid from barrier space 36, inlet 44 of inner container 32 can be closed to prevent more fluid from being delivered to inner container 32, and/or outlet 46 of inner container 32 can be closed to prevent the fluid in inner container 32 from being removed from inner container 32. In alternate embodiments, pressure vessel 30 can include only relief valve 60 or only pressure sensor 62 at fluid port 54.

Relief valve 60 and pressure sensor 62 allow for easy and quick detection of leaks in barrier space 36 when barrier space 36 is filled with a fluid having a high heat transfer coefficient. Detecting a leak from inner container 32 into barrier space 36 at relief valve 60 and pressure sensor 62 allows the leaked fluid to be removed from barrier space 36 before it leaks through outer container 34 and into an exterior environment surrounding pressure vessel 30.

Figure 3:
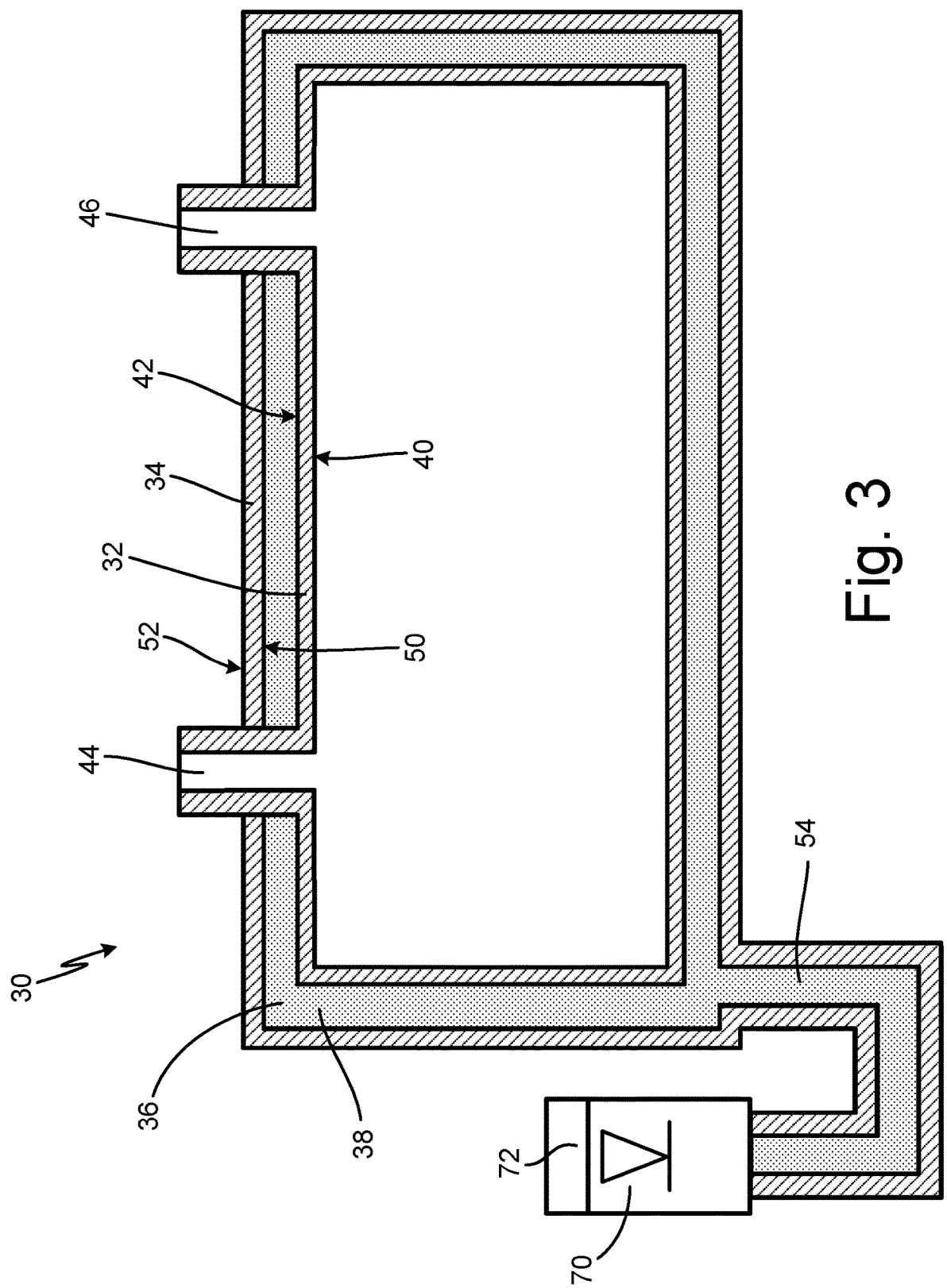
FIG. 3 is a cross-sectional view of the pressure vessel with an accumulator attached to the fluid port.

FIG. 3 is a cross-sectional view of the pressure vessel with an accumulator attached to the fluid port. Pressure vessel 30 includes inner container 32, outer container 34, barrier space 36, and captive fluid 38. Inner container 32 includes inner surface 40, outer surface 42, inlet 44, and outlet 46. Outer container 34 includes inner surface 50, outer surface 52, and fluid port 54. Pressure vessel 30 also includes accumulator 70 and position sensor 72.

Pressure vessel 30 is a double-walled pressure vessel that has inner container 32 positioned within outer container 34. Barrier space 36 is formed between inner container 32 and outer container 34. Barrier space 36 contains captive fluid 38 between inner container 32 and outer container 34. Inner container 32 includes inner surface 40 that defines an interior of inner container 32 and outer surface 42 that defines an exterior of inner container 32. Inner container 32 further includes inlet 44 and outlet 46 that form fluid ports for accessing the interior of inner container 32. Outer container 34 includes inner surface 50 that defines an interior of outer container 34 and outer surface 52 that defines an exterior of outer container 34. Outer container 34 further includes fluid port 54 that forms a point for accessing barrier space 36. Captive fluid 38 can be delivered to and evacuated from barrier space 36 through fluid port 54.

Captive fluid 38 is a fluid with a high heat transfer coefficient, such as a pressurized inert gas (for example pressurized nitrogen or pressurized helium), a thermal oil, a liquid metal (for example liquid sodium, liquid sodium-potassium, liquid lead-bismuth, or liquid nickel), a molten salt (for example molten sodium-potassium carbonates or molten sodium-potassium fluorides), or combinations thereof. Fluid port 54 is in fluid connection with accumulator 70, as shown in FIG. 3. Captive fluid 38 can flow through fluid port 54 to accumulator 70. If the pressure of captive fluid 38 rises above a threshold value, some of captive fluid 38 can enter accumulator 70. Captive fluid 38 can increase in pressure when the fluid in inner container 32 leaks through inner container 32 into barrier space 36. Accumulator 70 can absorb the increased pressure of captive fluid 38 with the leaked fluid. This prevents captive fluid 38 and the leaked fluid from leaking out of outer container 34 into an exterior environment.

Accumulator 70 can include position sensor 72. Position sensor 72 can be a linear variable displacement transformer. Position sensor 72 can sense the position of accumulator 70. Captive fluid 38 is charged into barrier space 36, fluid port 54, and accumulator 70 at a known volume dependent on the thermal expansion coefficient of captive fluid 38 and the material that pressure vessel 30 is made out of. Accumulator 70 is then set to a range of expected positions surrounding a position related to the known charge volume. Accumulator 70 can then continuously monitor the volume of captive fluid 38. If inner container 32 breaches and captive fluid moves into inner container 32 based on the differential pressure between inner container 32 and barrier space 36, then accumulator 70 and position sensor 72 will detect the breach because the position of accumulator 70 will deviate from the expected value. Similarly, if inner container 32 breaches and the stored fluid moves into barrier space 36, accumulator 70 and position sensor 72 will sense the change in position of accumulator 70 compared to the known charge position. If outer container 34 were to breach, then accumulator 70 and position sensor 72 would detect the deviation in position of accumulator 70 from the expected position that results from the breach. When position sensor 72 senses a change in pressure from the known charge value, captive fluid 38 and the leaked fluid from barrier space 36 can be removed from pressure vessel 30, inlet 44 of inner container 32 can be closed to prevent more fluid from being delivered to inner container 32, and/or outlet 46 of inner container 32 can be closed to prevent the fluid in inner container 32 from being removed from inner container 32. In alternate embodiments, pressure vessel 30 can include only accumulator 70 or only position sensor 72 at fluid port 54.

Accumulator 70 and position sensor 72 allow for easy and quick detection of leaks in barrier space 36 when barrier space 36 is filled with a fluid having a high heat transfer coefficient. Detecting a leak form inner container 32 into barrier space 36 at accumulator 70 and position sensor 72 allows the leaked fluid to be removed from barrier space 36 before it leaks through outer container 34 and into an exterior environment surrounding pressure vessel 30.

Figure 4:
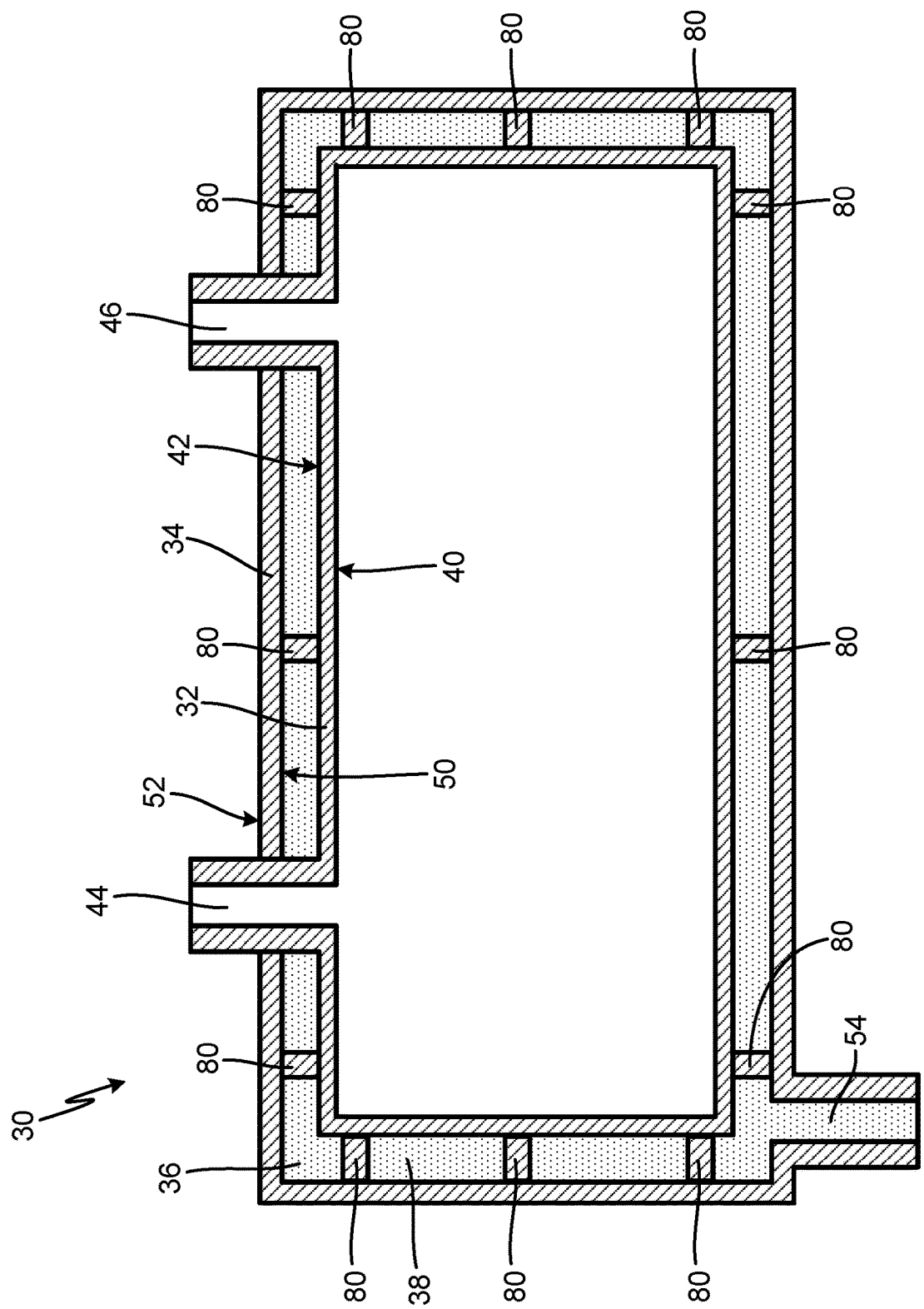
FIG. 4 is a perspective view of the pressure vessel with heat transfer elements.

FIG. 4 is a perspective view of pressure vessel 30 with heat transfer elements 80. Pressure vessel 30 includes inner container 32, outer container 34, barrier space 36, and captive fluid 38. Inner container 32 includes inner surface 40, outer surface 42, inlet 44, and outlet 46. Outer container 34 includes inner surface 50, outer surface 52, and fluid port 54. Pressure vessel 30 also includes heat transfer elements 80.

Pressure vessel 30 is a double-walled pressure vessel that has inner container 32 positioned within outer container 34. Barrier space 36 is formed between inner container 32 and outer container 34. Barrier space 36 contains captive fluid 38 between inner container 32 and outer container 34. Inner container 32 includes inner surface 40 that defines an interior of inner container 32 and outer surface 42 that defines an exterior of inner container 32. Inner container 32 further includes inlet 44 and outlet 46 that form fluid ports for accessing the interior of inner container 32. Outer container 34 includes inner surface 50 that defines an interior of outer container 34 and outer surface 52 that defines an exterior of outer container 34. Outer container 34 further includes fluid port 54 that forms a point for accessing barrier space 36. Captive fluid 38 can be delivered to and evacuated from barrier space 36 through fluid port 54.

Pressure vessel 30 also includes heat transfer elements 80. Heat transfer elements 80 extend from outer surface 42 of inner container 32 to inner surface 50 of outer container 34. Heat transfer elements 80 are integrally formed with pressure vessel 30. Heat transfer elements 80 can be shaped as pins, ribs, fins, or baffles. In alternate embodiments, heat transfer elements 80 can extend from outer surface 42 of inner container 32 into a center of barrier space 36 or from inner surface 50 of outer container 54 into a center of barrier space 36. Heat transfer elements 80 are integrally formed with pressure vessel 30. Pressure vessel 30 can include any number of heat transfer elements 80. Heat transfer elements 80 are positioned in pressure vessel 30 so that captive fluid 38 can move through barrier space 36 around heat transfer elements 80.

Heat transfer elements 80 provide conductive pathways from inner container 32 to outer container 34 and an exterior environment surrounding pressure vessel 30. Typically, pressure vessels have a barrier space the acts as an insulator and prevents heat from efficiently transferring between the inner container and the outer container. Heat transfer elements 80 improve the heat transfer efficiency of pressure vessel 30 by providing pathways for heat to transfer between inner container 32 and outer container 34.

Heat transfer elements 80 also act as structural elements for pressure vessel 30. Pressure vessel 30 can have any suitable shape and heat transfer elements 80 can be positioned in pressure vessel 30 to improve the structural strength of pressure vessel 30. Integrally forming inner container 32, outer container 34, and heat transfer elements 80 reduces the weight and lowers the manufacturing time of pressure vessel 30. Integrally forming pressure vessel 30 also reduces the areas in which pressure vessel 30 can develop breaks, as less welding, brazing, and/or other joining methods are used in manufacturing.

Pressure vessel 30 can include any combinations of relief valve 60 (shown in FIG. 2), pressure sensor 62 (shown in FIG. 2), accumulator 70 (shown in FIG. 3), position sensor 72 (shown in FIG. 3), and heat transfer elements 80 (shown in FIG. 4).

Figure 5:
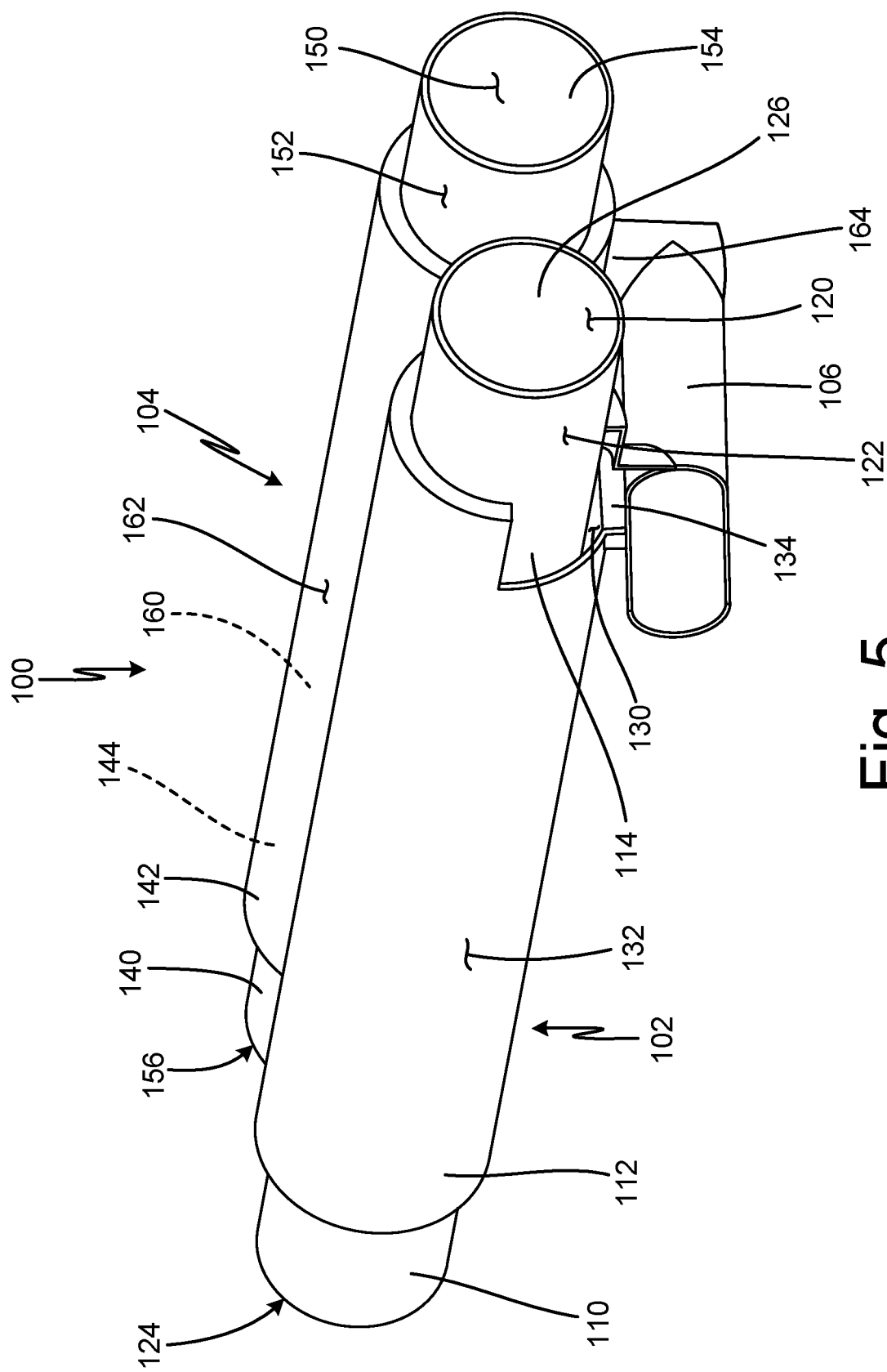
FIG. 5 is a cut-away perspective view of a pressure vessel system with a first pressure vessel and a second pressure vessel connected to a central drain port.

FIG. 5 is a cut-away perspective view of pressure vessel system 100 with first pressure vessel 102 and second pressure vessel 104 connected to central drain port 106. Pressure vessel system 100 includes first pressure vessel 102, second pressure vessel 104, and central drain port 106. First pressure vessel 102 includes inner container 110, outer container 112, and barrier space 114. Inner container 110 includes inner surface 120, outer surface 122, inlet 124, and outlet 126. Outer container 112 includes inner surface 130, outer surface 132, and fluid port 134. Second pressure vessel 104 includes inner container 140, outer container 142, and barrier space 144. Inner container 140 includes inner surface 150, outer surface 152, inlet 154, and outlet 156. Outer container 142 includes inner surface 160, outer surface 162, and fluid port 164.

Pressure vessel system 100 includes first pressure vessel 102 and second pressure vessel 104 connected to one another and to central drain port 106. First pressure vessel 102 and second pressure vessel 104 run parallel to one another and are integrally formed with one another. Central drain port 106 is connected to first pressure vessel 102 and second pressure vessel 104 at a first end of first pressure vessel 102 and second pressure vessel 104. Central drain port 106 is integrally formed with first pressure vessel 102 and second pressure vessel 104. In alternate embodiments, pressure vessel system 100 can have any number of pressure vessels that are integrally formed with one another and with central drain port 106.

First pressure vessel 102 is shown as being a pipe in FIG. 5, but can have any suitable shape in alternate embodiments. First pressure vessel 102 includes inner container 110 positioned within outer container 112. Inner container 110 is a first container and outer container 112 is a second container. A first end and a second end of inner container 110 extend past outer container 112 in the embodiment shown in FIG. 5. Barrier space 114 is formed between inner container 110 and outer container 112. Barrier space 114 is configured to contain a captive fluid (not shown in FIG. 5) between inner container 110 and outer container 112. Inner container 110 includes inner surface 120 that defines an interior of inner container 110 and outer surface 122 that defines an exterior of inner container 110. Inner container 110 further includes inlet 124 and outlet 126 that form fluid ports for accessing the interior of inner container 110. Outer container 112 includes inner surface 130 that defines an interior of outer container 112 and outer surface 132 that defines an exterior of outer container 112. Outer container 112 further includes fluid port 134 that forms a point for accessing barrier space 114. A captive fluid can be delivered to and evacuated from barrier space 114 through fluid port 134.

First pressure vessel 102 has a double-walled construction and is designed to hold a fluid within inner container 110. Outer container 112 creates a second barrier between inner container 110 and an exterior environment. The fluid enters inner container 110 through inlet 124 and exits inner container 110 through outlet 126. If the fluid in inner container 110 leaks through inner container 110, it will be caught in barrier space 114 instead of leaking into the exterior environment surrounding first pressure vessel 102. Fluid port 134 can be used to remove the leaked fluid from first pressure vessel 102.

Second pressure vessel 104 is shown as being a pipe in FIG. 5, but can have any suitable shape in alternate embodiments. Second pressure vessel 104 includes inner container 140 positioned within outer container 142. Inner container 140 is a first container and outer container 142 is a second container. A first end and a second end of inner container 140 extend past outer container 142 in the embodiment shown in FIG. 5. Barrier space 144 is formed between inner container 140 and outer container 142. Barrier space 144 is configured to contain a captive fluid (not shown in FIG. 5) between inner container 140 and outer container 142. Inner container 140 includes inner surface 150 that defines an interior of inner container 140 and outer surface 152 that defines an exterior of inner container 140. Inner container 140 further includes inlet 154 and outlet 156 that form fluid ports for accessing the interior of inner container 140. Outer container 142 includes inner surface 160 that defines an interior of outer container 142 and outer surface 162 that defines an exterior of outer container 142. Outer container 142 further includes fluid port 164 that forms a point for accessing barrier space 144. A captive fluid can be delivered to and evacuated from barrier space 144 through fluid port 164.

Second pressure vessel 104 has a double-walled construction and is designed to hold a fluid within inner container 140. Outer container 142 creates a second barrier between inner container 140 and an exterior environment. The fluid enters inner container 140 through inlet 154 and exits inner container 140 through outlet 156. If the fluid in inner container 140 leaks through inner container 140, it will be caught in barrier space 144 instead of leaking into the exterior environment surrounding second pressure vessel 104. Fluid port 164 can be used to remove the leaked fluid from second pressure vessel 104.

Fluid port 134 of first pressure vessel 102 and fluid port 164 of second pressure vessel 104 are fluidly coupled to central drain port 106. Central drain port 106 includes an opening for delivering the captive fluid to and removing the captive fluid from central drain port 106. The captive fluid in central drain port 106 can be fluidly communicated to barrier space 114 of first pressure vessel 102 through fluid port 134 and to barrier space 144 of second pressure vessel 104 through fluid port 164.

Pressure vessel system 100 can be used as a heat exchanger. A hot fluid can flow from inlet 124 to outlet 126 of inner container 110 of first pressure vessel 102, and a cold fluid can flow from inlet 154 to outlet 156 of inner container 140 of second pressure vessel 104. For example, the hot fluid can be exhaust air and the cold fluid can be fuel. Heat from the exhaust fluid can be transferred through pressure vessel system 100 to warm the fuel in second pressure vessel 104. In the embodiment shown in FIG. 5, the hot fluid in first pressure vessel 102 and the cold fluid in second pressure vessel 104 are flowing in opposite directions. In alternate embodiments, the hot fluid in first pressure vessel 102 and the cold fluid in second pressure vessel 104 can flow in the same direction. In further alternate embodiments, the hot fluid can flow through second pressure vessel 104 and the cold fluid can flow through first pressure vessel 102. Further, the hot fluid and the cold fluid can be delivered to and stored in first pressure vessel 102 and second pressure vessel 104.

Heat from the hot fluid in inner container 110 of first pressure vessel 102 can transfer through outer container 112, the captive fluid in barrier space 114, and outer container 112 of first pressure vessel 102 and then through outer container 142, the captive fluid in barrier space 144, and the inner container 140 of second pressure vessel 104 into the cold fluid in inner container 140 of second pressure vessel 104. The captive fluid in barrier space 114 of first pressure vessel 102 and in barrier space 144 of second pressure vessel 104 is an inert fluid with a high heat transfer coefficient, such as a pressurized inert gas (for example pressurized nitrogen or pressurized helium), a thermal oil, a liquid metal (for example liquid sodium, liquid sodium-potassium, liquid lead-bismuth, or liquid nickel), a molten salt (for example molten sodium-potassium carbonates or molten sodium-potassium fluorides), or combinations thereof. The captive fluid increases the heat conduction between first pressure vessel 102 and second pressure vessel 104.

Central drain port 106 fluidly couples barrier space 114 of first pressure vessel 102 and barrier space 144 of second pressure vessel 104. A leak detection mechanism (not shown in FIG. 5) can be attached to central drain port 106 to detect a leak in either first pressure vessel 102 or second pressure vessel 104. The leak detection mechanism can be a relief valve and/or pressure sensor as discussed in reference to FIG. 2, an accumulator and/or a position sensor as discussed in reference to FIG. 3, or any other mechanism that is suitable for detecting a leak in pressure vessel system 100. If a leak is detected by the leak detection mechanism, inlet 124 and/or outlet 126 of first pressure vessel 102 and/or inlet 144 and/or outlet 146 of second pressure vessel 104 can be closed.

First pressure vessel 102 can also include heat transfer elements, such as the heat transfer elements shown in FIG. 4, extending from inner container 110 to outer container 112. Second pressure vessel 104 can also include heat transfer elements, such as the heat transfer elements shown in FIG. 4, extending from inner container 140 to outer container 142. Heat transfer elements can improve the heat transfer capabilities of pressure vessel system 100 and can improve the structural strength of pressure vessel system 100.

Pressure vessel system 100 requires less space and weight than a series of separate pressure vessels, as a single leak detection mechanism can be used to detect leaks in both first pressure vessel 102 and second pressure vessel 104. Pressure vessel system 100 efficiently transfers heat between fluid in first pressure vessel 102 and fluid in second pressure vessel 104 using the captive fluid in barrier space 114 of first pressure vessel 102 and barrier space 144 of second pressure vessel 104.

Discussion of Possible Embodiments

The following are non-exclusive descriptions of possible embodiments of the present invention.

A pressure vessel includes a first container and a second container surrounding the first container and including a fluid port. The pressure vessel further includes a barrier space extending between the first container and the second container and a leak detection mechanism connected to the fluid port on the second container that is configured to detect a leak in the pressure vessel.

The pressure vessel of the preceding paragraph can optionally include, additionally and/or alternatively, any one or more of the following features, configurations, and/or additional components:

The barrier space contains a fluid with a high heat transfer coefficient.

The fluid contained in the barrier space is selected from the group consisting of liquid nickel, liquid sodium-potassium, liquid sodium, liquid lead-bismuth, thermal oil, molten sodium-potassium carbonate, molten sodium-potassium fluoride, pressurized nitrogen, pressurized helium, and combinations thereof.

The leak detection mechanism is a pressure sensor.

The leak detection mechanism is a relief valve.

The leak detection mechanism is a relief valve with a pressure sensor.

The leak detection mechanism is an accumulator.

The leak detection mechanism is an accumulator and a position sensor.

The first container has a first inner surface and a first outer surface, the second container has a second inner surface and a second outer surface, and the barrier space extends from the first outer surface to the second inner surface.

The pressure vessel further includes a heat transfer element within the barrier space extending from the first outer surface to the second inner surface.

The first container, the second container, and the heat transfer element are integrally formed.

The heat transfer element is selected from the group consisting of pins, ribs, baffles, fins, and combinations thereof.

A pressure vessel system includes a first pressure vessel and a second pressure vessel. The first pressure vessel includes a first container, a second container surrounding the first container and including a fluid port, and a barrier space extending between the first container and the second container. The second pressure vessel includes a first container, a second container surrounding the first container and including a fluid port, and a barrier space extending between the first container and the second container. The pressure vessel system further includes a central drain port fluidly coupled to the fluid port of the first pressure vessel and the fluid port of the second pressure vessel.

The pressure vessel system of the preceding paragraph can optionally include, additionally and/or alternatively, an one or more of the following features, configurations and/or additional components:

The barrier space of the first pressure vessel, the barrier space of the second pressure vessel, and the central drain port contain a fluid having a high heat transfer coefficient.

The fluid contained in the barrier space of the first pressure vessel, the barrier space of the second pressure vessel, and the central drain port is selected from the group consisting of liquid nickel, liquid sodium-potassium, liquid sodium, liquid lead-bismuth, thermal oil, molten sodium-potassium carbonate, molten sodium-potassium fluoride, pressurized nitrogen, pressurized helium, and combinations thereof.

The central drain port is connected to a leak detection mechanism.

The leak detection mechanism is a relief valve and a pressure sensor.

The leak detection mechanism is an accumulator and a position sensor.

The first pressure vessel further includes a heat transfer element within the barrier space extending from the first container to the second container.

The second pressure vessel further includes a heat transfer element within the barrier space extending from the first container to the second container.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure vessel comprising:
   a first container;
   a second container surrounding the first container and including a fluid port;
   a barrier space extending between the first container and the second container;
   a high heat transfer coefficient fluid contained within the barrier space, wherein the fluid is configured to transfer heat between the first container and an exterior environment outside of the second container; and
   a leak detection mechanism connected to the fluid port on the second container that is configured to detect a leak in the pressure vessel by detecting a change in the fluid pressure in the barrier space.

2. The pressure vessel of claim 1, wherein the fluid contained in the barrier space is selected from the group consisting of liquid nickel, liquid sodium-potassium, liquid sodium, liquid lead-bismuth, thermal oil, molten sodium-potassium carbonate, molten sodium-potassium fluoride, pressurized nitrogen, pressurized helium, and combinations thereof.

3. The pressure vessel of claim 1, wherein the leak detection mechanism is a pressure sensor.

4. The pressure vessel of claim 1, wherein the leak detection mechanism is a relief valve.

5. The pressure vessel of claim 1, wherein the leak detection mechanism is a relief valve with a pressure sensor.

6. The pressure vessel of claim 1, wherein the leak detection mechanism is an accumulator.

7. The pressure vessel of claim 1, wherein the leak detection mechanism is an accumulator and a position sensor.

8. The pressure vessel of claim 1, wherein:
   the first container has a first inner surface and a first outer surface;
   the second container has a second inner surface and a second outer surface; and
   the barrier space extends from the first outer surface to the second inner surface.

9. The pressure vessel of claim 8, and further comprising:
   a heat transfer element within the barrier space extending from the first outer surface to the second inner surface.

10. The pressure vessel of claim 9, wherein the first container, the second container, and the heat transfer element are integrally formed.

11. The pressure vessel of claim 9, wherein the heat transfer element is selected from the group consisting of a pin, a rib, a baffle, a fin, and combinations thereof.

12. A pressure vessel comprising:
    a first container having a first inner surface and a first outer surface;
    a second container surrounding the first container and having a second inner surface, a second outer surface, and a fluid port;
    a barrier space containing a fluid extending between the first outer surface of the first container and the second inner surface of the second container; and
    a leak detection mechanism connected to the fluid port on the second container that is configured to detect a leak in the pressure vessel by detecting a change in the fluid pressure in the barrier space;
    wherein the barrier space contains a heat transfer element connected to at least one of the first outer surface of the first container and the second inner surface of the second container and positioned in the pressure vessel to transfer heat between the first container and the second container.

13. The pressure vessel of claim 12, wherein the first container, the second container, and the heat transfer element are integrally formed.

14. The pressure vessel of claim 12, wherein the heat transfer element is selected from the group consisting of a pin, a rib, a baffle, a fin, and combinations thereof.

15. The pressure vessel of claim 12, wherein the barrier space contains a fluid with a high heat transfer coefficient that is configured to transfer heat between the first container and an exterior environment outside of the second container.

16. The pressure vessel of claim 15, wherein the fluid contained in the barrier space is selected from the group consisting of liquid nickel, liquid sodium-potassium, liquid sodium, liquid lead-bismuth, thermal oil, molten sodium-potassium carbonate, molten sodium-potassium fluoride, pressurized nitrogen, pressurized helium, and combinations thereof.

17. The pressure vessel of claim 12, wherein the leak detection mechanism is a pressure sensor.

18. The pressure vessel of claim 12, wherein the leak detection mechanism is a relief valve with a pressure sensor.

19. The pressure vessel of claim 12, wherein the leak detection mechanism is an accumulator.

20. The pressure vessel of claim 12, wherein the leak detection mechanism is an accumulator and a position sensor.

* * * * *